United States Patent [19]
Park

[11] Patent Number: 5,848,033
[45] Date of Patent: Dec. 8, 1998

[54] METHOD FOR SEARCHING IDENTIFICATION OF DISK MOUNTING SECTION IN OPTICAL DISK CHANGER SYSTEM

[75] Inventor: Chan-Sou Park, Chungcheongnam-do, Rep. of Korea

[73] Assignee: Daewoo Electronics Co., Ltd., Seoul, Rep. of Korea

[21] Appl. No.: 903,799

[22] Filed: Jul. 31, 1997

[30] Foreign Application Priority Data

Jul. 31, 1996 [KR] Rep. of Korea ........................ 96-31782
Sep. 30, 1996 [KR] Rep. of Korea ........................ 96-42943

[51] Int. Cl.⁶ .................................................. G11B 17/22
[52] U.S. Cl. ............................................... 369/34; 369/36
[58] Field of Search .................................. 369/34, 36, 37, 369/30, 77.1, 75.2, 39, 32, 38; 360/98.04, 98.06, 92

[56] References Cited

U.S. PATENT DOCUMENTS

| | | | |
|---|---|---|---|
| 5,043,963 | 8/1991 | Iwamoto | 369/36 |
| 5,077,717 | 12/1991 | Onishi et al. | 369/36 |
| 5,132,949 | 7/1992 | Choi | 369/37 |
| 5,235,568 | 8/1993 | Masaru | 369/2 |
| 5,251,192 | 10/1993 | Liu | 369/36 |
| 5,541,897 | 7/1996 | Baca et al. | 369/37 |

FOREIGN PATENT DOCUMENTS

0691652A1  1/1996  European Pat. Off. .

*Primary Examiner*—Ali Neyzari
*Attorney, Agent, or Firm*—Jacobson, Price, Holman & Stern, PLLC

[57] ABSTRACT

A method for searching an identification of a disk mounting section selectively reproduces a desired disk in an optical disk changer system. In the method, all data for searching the identification is initialized. Whether a present identification is equal to a selected identification is determined. Whether the turntable of the optical disk changer system is rotating is determined. Whether the detection signal is generated once a first time is determined. Whether the old and present pulses are a first state or a second state in logic is determined. Whether an identification number is equal to the selected identification is determined. The method searches ID of a disk mounting section regardless of a rapid and exact rotating direction of a turntable to thereby play back a desired disk in an optical disk changer system.

20 Claims, 7 Drawing Sheets

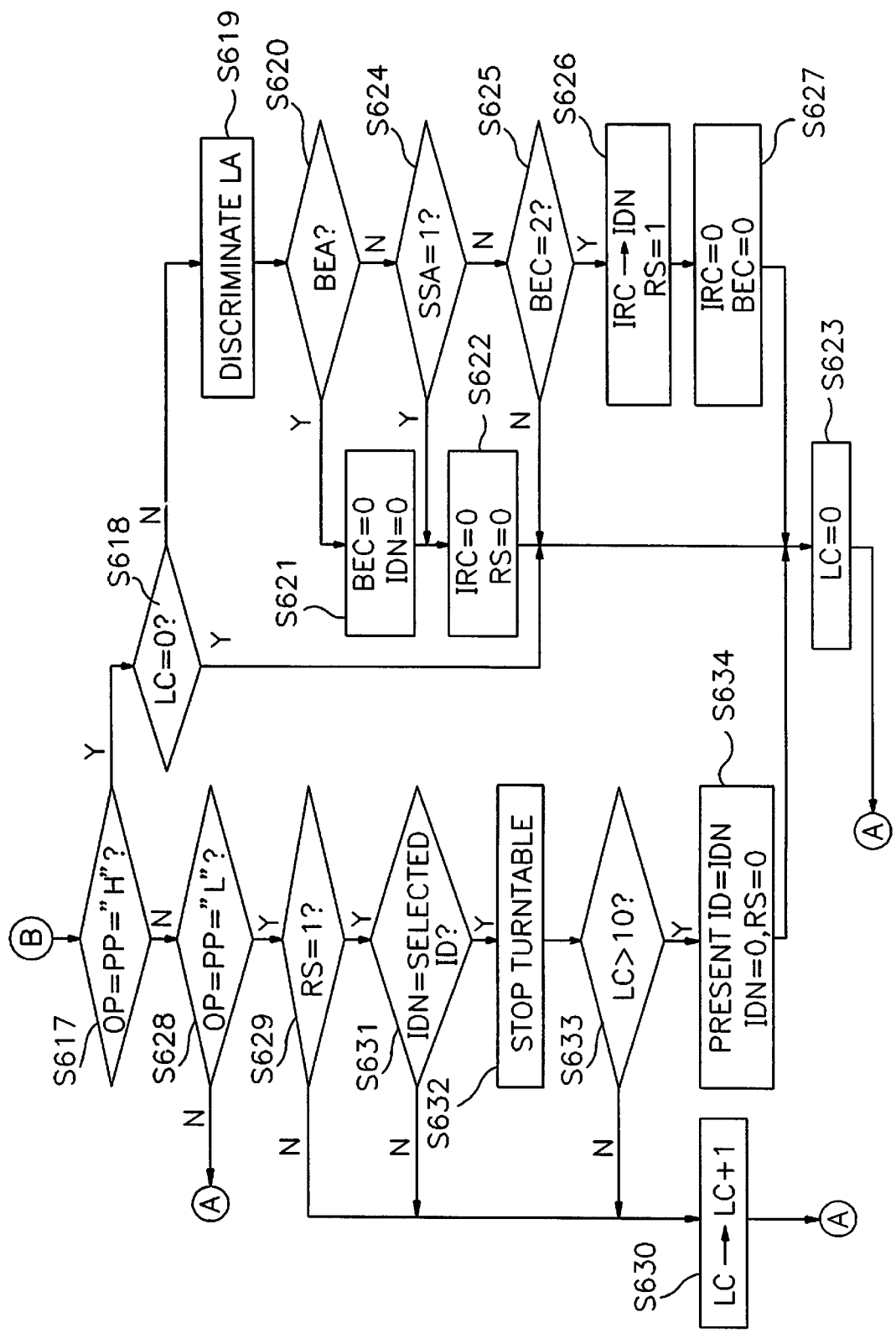

METHOD FOR SEARCHING IDENTIFICATION OF DISK MOUNTING SECTION IN OPTICAL DISK CHANGER SYSTEM

BACKGROUND OF THE INVENTION

1. Field of the Invention

The present invention relates to an optical disc changer system, more particularly, to a method for searching an identification (ID) of a disk mounting section in an optical disk changer system.

2. Description of the Prior Art

A typical optical disc reproducing apparatus such as an optical disc player includes a compact disk player (CDP), a laser disk player (LDP), a compact disk graphic player (CDGP), and a video compact disk player (VCDP). Currently, a digital video disk (DVD) which uses a moving image compression technique such as a moving picture experts group-2 (MPEG-2) has been developed. Several giga bytes(GB) of data for a moving picture may be recorded for reproduction in 12 cm optical disc available at present on the marketplace. In order to enhance a performance of the digital video disc, the tendency is toward developing a function thereof.

On the other hand, such optical disk players reproduce image and/or sound which are recorded in the optical disk to output it and/or them through a screen and/or a speaker. Since the optical disk players have a higher signal-to-noise ratio than that of conventional image and/or sound reproducing apparatuses, they can produce image and/or sound having better features, do not generate noise, have no ghost, and are very low in distortion, by an irregular playback and modulation. Also, the optical disk players can randomly gain access to disk. Accordingly, the optical disk players have various advantages as mentioned previously, and the tendency is toward quick development and being spread widely thereto.

As the performance and function of the digital video disk have been developed, a kind of data which are recorded in the optical disk have become varied. In an optical disk which contains massive data, a disk cannot record all data which correspond to a piece of movie. Furthermore, a user should replace a used disk with a new disk every time the user uses the optical disk player.

In order to improve the above disadvantages, an optical disk changer system has been developed. After the optical disk changer system mounts a plurality of disks on a disk tray, it can sequentially reproduce the plurality of disks by ones and can selectively reproduce desired disks among the plurality of disks. The optical disk changer system includes a disk tray capable of mounting the plurality of disks thereon. A turntable for rotating the plurality of disks is mounted under the disk tray. The turntable rotates to change the position of the disk tray, for the purpose of performing a predetermined function.

FIGS. 1 and 2 show a pulse which is used in a conventional method for searching an ID of a disk mounting section in an optical disk changer system.

Referring to FIGS. 3 and 4, the ID sensor 406 generates continuously low pulses indicating the ID of the disk mounting section, and four continuously low pulses between the continuously low pulses indicating a start/end code as shown in FIGS. 1 and 2. That is, the start/end code is generated among constant IDs with respect to each disk mounting section 304 of the turntable 402 being rotated and is a code for distinguishing a starting portion of the constant ID from an ending portion thereof. Magnitude of the low pulse indicating the ID is different from that of the low pulse indicating the start/end code. A low state time of the low pulse indicating the ID is 20 msec, and a high state time thereof is 35 msec. Low and high state times of the low pulse indicating the start/end code are 60 msec and 15 msec, respectively. A high state time is maintained for 350 msec between the ID and the start/end code.

In accordance with a conventional method for searching an ID of a disk mounting section, in order to search the ID of a corresponding disk mounting section in the optical disk changer system, after the turntable 402 rotates and the ID sensor 406 detects the above start/end code and a corresponding ID of the disk mounting section is searched.

In the conventional method, when rotating a turntable in forward and reverse directions a width of the ID pulse is similar to that of the start/end pulse. Hence, when the turntable rotates in a reverse direction, it must reach the start/stop pulse code to rotate in a reverse next direction. Accordingly, when a rotating direction varies, it takes a long time to search the ID of the disk mounting section. Also, an error is easily generated in an ID recognition.

U.S. Pat. No. 5,235,568 issued to Noguchi Masaru discloses a system and the control method thereof for compact disk changer player and radio receiver. A combination system for commonly controlling a compact disk changer player and a radio receiver has a plurality of memory/call switches for selectively operating the compact disk changer player and the radio receiver under the control of a microcomputer; and a radio/compact disk changeover switch, for selectively playing back a user's desired disk and track. In the control method of the combined system for commonly controlling the compact disk changer player and the radio receiver, the first and second inputs of the memory/call switches coincide with a ten's place number corresponding to a disk number and a one's place number corresponding to a track number, respectively and a radio frequency changeover data is generated to operate the radio receiver when the radio/compact disk changeover switch is switched to the radio receiver, while a disk number changeover data and a track number changeover data are generated to operate the compact disk changer player when the radio/compact disk changeover switch is switched to the compact disk. However, the patent of Noguchi Masaru does not disclose a method for searching ID of a disk mounting section in a optical disk changer system.

SUMMARY OF THE INVENTION

Therefore, it is an object of the present invention, for the purpose of solving the above mentioned problems, to provide a method for searching an ID of a disk mounting section for the purpose of selectively playing back a desired disk in an optical disk changer system.

In order to accomplish the above object, there is provided a method for searching an identification of a disk mounting section in an optical disk changer system, the method comprising:

(a) initializing all data for searching the identification;

(b) determining whether a present identification is equal to a selected identification in order to control a driving of a disk which is mounted on the optical disk changer system according to the determination result;

(c) determining whether the turntable of the optical disk changer system is rotating in order to control generation of a pulse for searching the identification including an identification recognition pulse area, a beginning/ end pulse area, and a start/stop pulse area and control generattion of a signal for detecting the identification searching pulse according to the determination result;

(d) determining whether the detection signal is generated once every first time in order to control set values of an interval of the detection signal, an old pulse, and a present pulse, wherein the old and present pulses are respectively pulses which before and at present are detected in the detection signal according to the determination result;

(e) determining whether the old and present pulses are a first state or a second state in logic;

(f) determining whether an identification number is equal to the selected identification in order to determine whether a disk mounting section corresponding to the selected identification is searched when the old and present pulses are a first state in logic, and detecting the identification recognition pulse area, the beginning/end pulse area, and the start/stop pulse area when the old and present pulses are a second state in logic, in step (e).

The present invention searches ID of a disk mounting section regardless of a rapid and exact rotating direction of a turntable to thereby play back a desired disk in an optical disk changer system.

Other objects and further features of the present invention will become apparent from the detailed description when read in conjunction with the attached drawings.

BRIEF DESCRIPTION OF THE DRAWINGS

The above objects and advantages of the present invention will become more apparent by describing in detail a preferred embodiment thereof with reference to the attached drawings in which:

FIG. 8A is a wave form chart of a pulse for detecting an ID of a disk mounting section generated by the ID sensor of FIG. 4;

FIGS. 6A and 6B are flow chart for illustrating a method for searching an ID of a disk mounting section in an optical disk changer system according to an embodiment of the present invention.

DESCRIPTION OF THE PREFERRED EMBODIMENT

A description will be given below in detail, with reference to the accompanying drawings, of the operation of a method for searching an ID of a disk mounting section in an optical disk changer system according to one embodiment of the present invention.

Figure 1:
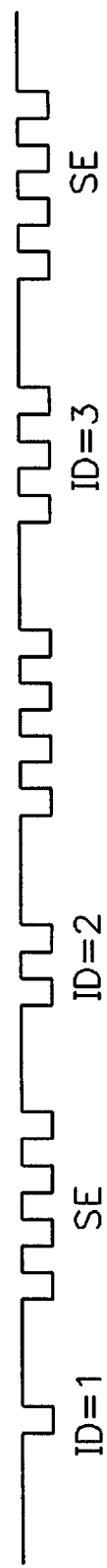
FIG. 1 is a wave form chart of a pulse which is used in a conventional method for searching an ID of a disk mounting section in an optical disk changer system.
Figure 2:
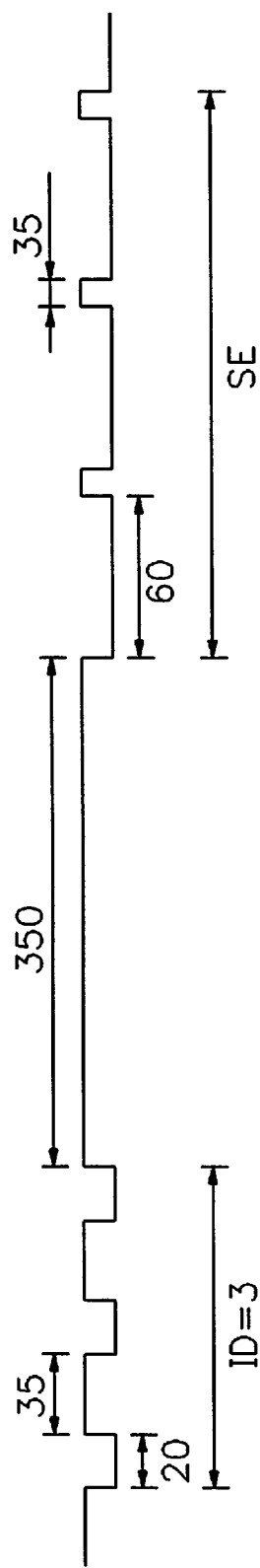
FIG. 2 is an enlarged detail of FIG. 1.
Figure 3:
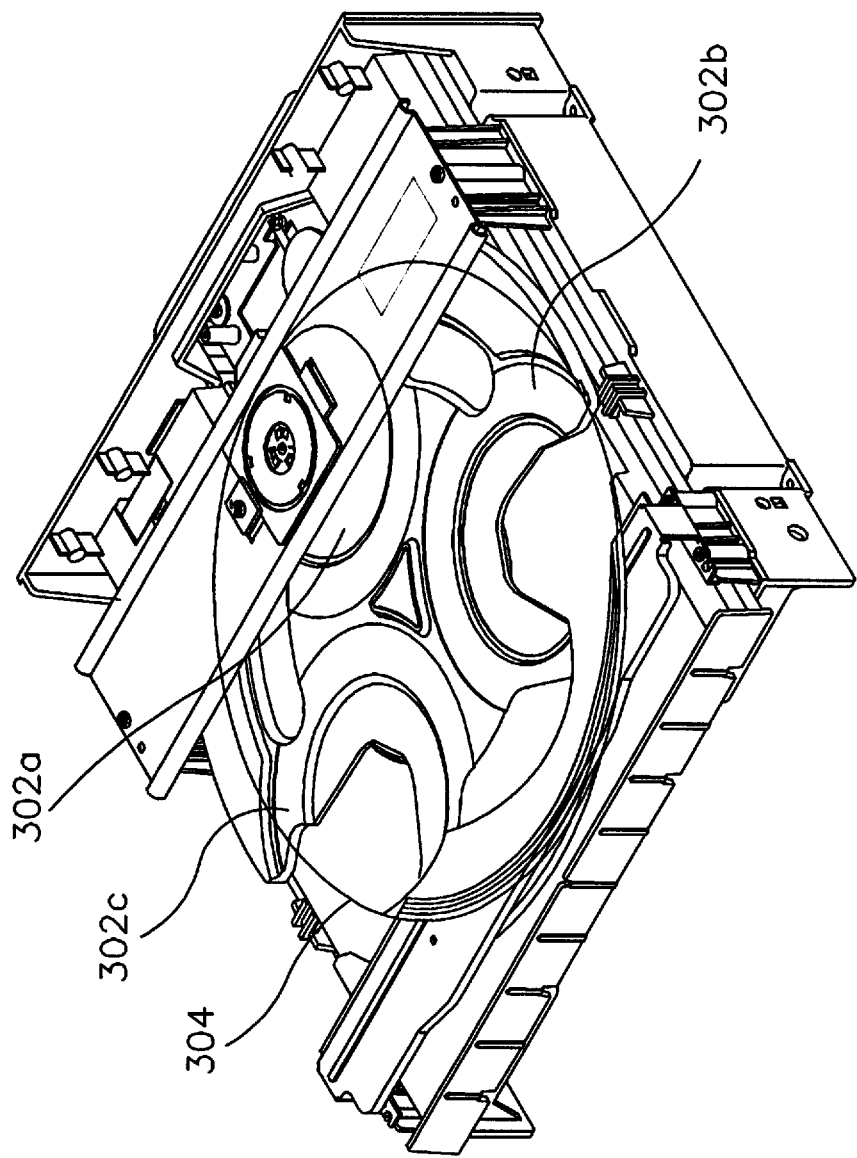
FIG. 3 is a perspective view of a disk tray in an optical disk changer system which is applied to the present invention.

FIG. 3 shows a disk tray 30 in an optical disk changer system which is applied to the present invention. The disk tray 30 includes three disk mounting sections 302a, 302b and 302c and a turntable 304 vertically connected under the disk mounting sections 302a, 302b, and 302c through a predetermined axis. Each of the three disk mounting sections 302a, 302b, and 302c is endowed with a different ID for discriminating one another. Referring to FIG. 3, three disk mounting sections 302a, 302b, and 302c have an ID No. 1, an ID No. 2, and an ID No. 3, respectively. That is, the IDs are codes for searching a desired single disk among three disks which are mounted on the three disk mounting sections 302a, 302b, and 302c.

Figure 4:
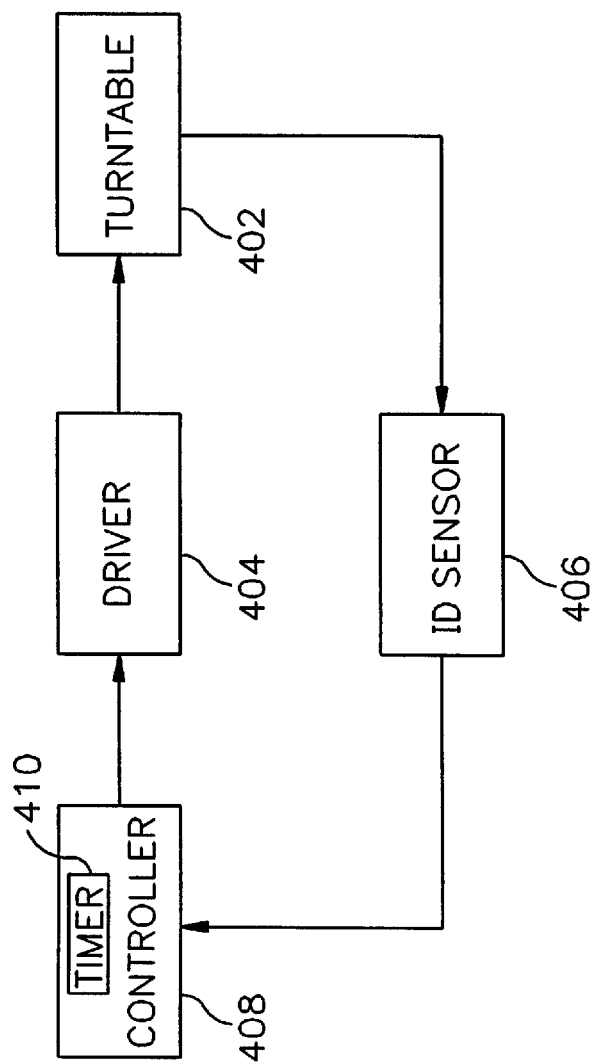
FIG. 4 is a block diagram for showing a configuration of an ID searching device in an optical disk changer system which is applied to the present invention.

FIG. 4 shows a configuration of a device for searching ID of disk in an optical disk changer system. A turntable 304 rotates in forward and reverse directions by driving a driver 404 under a control of a controller 408. An ID sensor 406 is installed at a low surface of the turntable 304. As shown in FIG. 4, when a first disk mounting section 302a of an ID No. 1 is mounted the ID sensor 406 generates one low pulse to provide to the controller 408, when a second disk mounting section 302b of an ID No. 2 is mounted the ID sensor 206 generates two continuously low pulses to provide to the controller 408, and when a third disk mounting section 302c of an ID No. 3 is mounted the ID sensor 206 generates three continuously low pulses to provide to the controller 208. Accordingly, the controller 208 counts the number of low pulse(s) from the ID sensor 206 and discriminates the ID of the disk mounting sections 302a, 302b, and 302c based on the number of the low pulses.

Figure 5A:
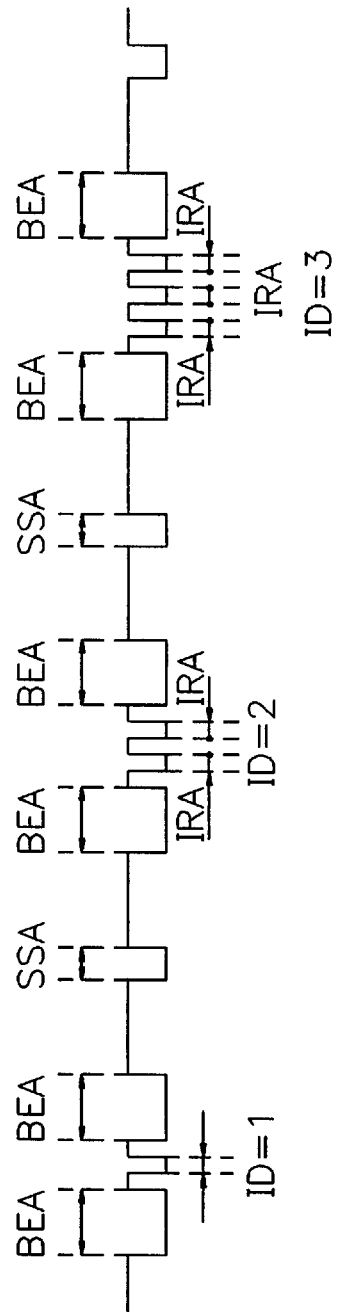
FIG. 5B is an enlarged detail of FIG. 5A.
Figure 5B:
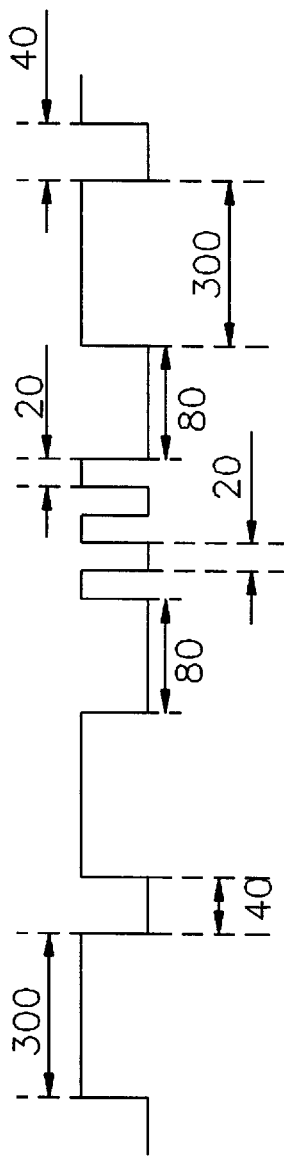

FIGS. 5A and 5B show a pulse for detecting IDs of a disk mounting section generated by the ID sensor of FIG. 4. An output pulse of the ID sensor 406 for searching an ID includes three frames, that is, a first frame, a second frame, and a third frame. Each of the three frames of the output pulse includes a predetermined ID recognition pulse area IRA defined by one or more low pulse areas, a pair of beginning/end pulse areas BEA which are low in logic at beginning and end positions of the ID recognition pulse area IRA, and a start/stop pulse area SSA located between the beginning/end pulse areas BEA. The first, second, and third frames have an ID recognition pulse area having one low pulse, two low pulses, and three low pulses, respectively. Preferably, in an embodiment of the present invention, the ID recognition pulse area IRA, the beginning/end pulse area BEA, and the start/stop pulse area SSA are largest to smallest in order of magnitudes. More preferably, the magnitude of the beginning/end pulse area BEA is twice as much as that of the ID recognition pulse area IRA, and the start/stop pulse area SSA is twice as much as that of the beginning/end pulse area BEA, that is, four times as much as the magnitude of the ID recognition pulse area IRA. Most preferably, the magnitudes of the ID recognition pulse area IRA, the start/stop pulse SSA, and the beginning/end pulse area BEA are 20 msecs, 40 msecs, and 80 msecs, respectively. Moreover, a magnitude of a high state between the start/stop pulse SSA and the beginning/end pulse area BEA is larger than that of the beginning/end pulse area BEA. Preferably, the magnitude of a high state between the start/stop pulse SSA and the beginning/end pulse area BEA is 300 msecs.

Figure 6A:
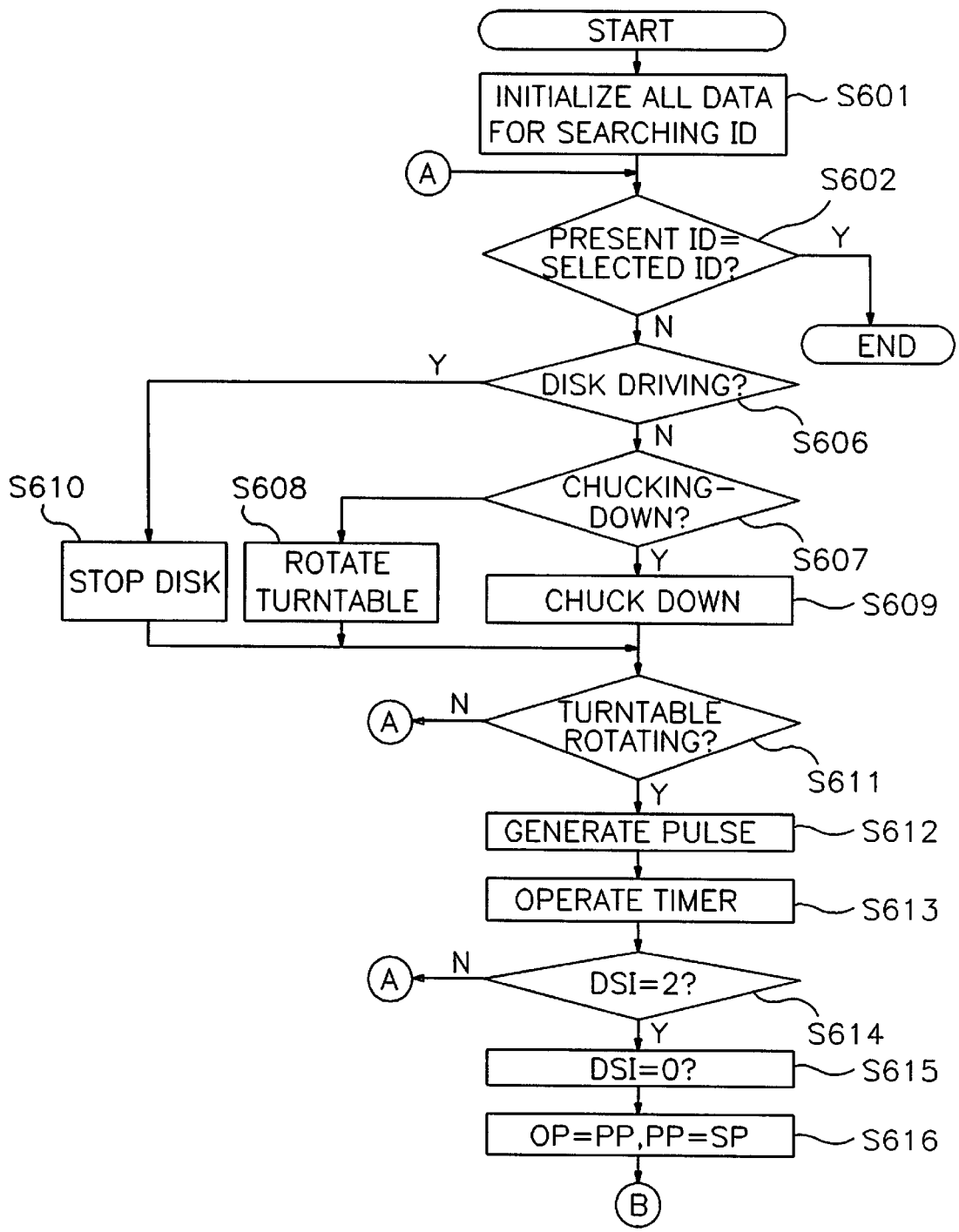

Hereinafter, an operation of the method for searching an ID of each of the disk mounting sections in an optical disk changer system according to an embodiment of the present invention with reference to FIGS. 6A and 6B will be explained. FIGS. 6A and 6B illustrates a method for searching an ID of a disk mounting section according to an embodiment of the present invention.

In step S601, when an user selects a disk ID searching mode, the controller 408 initializes all data for searching an ID of a disk mounting section in an optical disk changer system. That is, the controller 408 sets a first count value IRC of an ID recognition pulse area IRA, a second count value BEC of a beginning/end pulse area BEA, a third count value SSC of a start/stop pulse area SSA, a fourth count value LC of a low logic area LA, an ID number IDN, a present ID, a generating interval of the signal RS for detecting the ID searching pulse, and an ID recognition signal to "o", sets a selected identification to "1", and sets logic states of the old and present pulses to "low".

In step S602, the controller 408 determines whether or not a present ID is equal to a selected ID. When it is determined that the present ID is equal to the selected ID in step S602, the total operation finishes. On the contrary, when it is determined that the present ID is different from the selected ID in step S602, the controller 408 determines whether or not a disk is driving (step S606). When it is determined that the disk stops in step S606, the controller 408 determines whether or not the turntable 304 is in a chucking-down state (step S607). When it is determined that the turntable 304 is in a chucking-down state in step S607, the controller 408 controls a driver 404 to rotate the turntable 304 (step S608). On the contrary, when the turntable 304 is in a chucking-up state, the controller 408 controls the driver 404 to chuck down the turntable 304 (step S609). On the other hand, when it is determined that the disk is driving in step S606, the controller 408 controls the driver 404 to stop the disk (step S610).

After step S604, S605, S608, S609, or S610 is performed, the controller 408 determines whether or not the turntable 304 is rotating (step S611). When it is determined that the turntable 304 stops in step S611, the routine returns to step S602. On the contrary, when the turntable 304 is rotating in step S611, the ID sensor 406 generates a constant pulse for searching the ID according to a rotation of the turntable 304 as show in FIG. 5A and provides it into the controller 408 in step S612. Then the controller 408 operates a timer 410 therein thereby to generate a signal DS for detecting the output pulse of the ID sensor 406 (step S613). In step S614, the controller 408 determines whether or not the detection signal DS is generated once every 2 msecs. When it is determined that the detection signal DS is not generated once every 2 msecs in step S614, the routine returns to step S602. On the contrary, when the detection signal DS is generated once "2 msecs", the controller 408 sets an generating interval DSI of the detection signal DS to "0" (step S615). In step S616, the controller 408 sets an old pulse OP equal to a present pulse PP and sets a present PP equal to a present output pulse SP of the ID sensor 406.

In step S617, the controller 408 determines whether or not logic states of old and present pulses are "high". When it is determined that the logic states of old and present pulses are "high" in step S617, the controller 408 determines whether or not a count value LC of a low logic area LA is "0" (step S618). When it is determined that the count value LC of a low logic area LA is not "0" in step S618, the controller 408 discriminates a low logic area LA from the output pulse of the ID sensor 406 (step S619). In step S620, the controller 408 determines whether or not the ID sensor 406 detects a start/stop pulse area SSA from the output pulse of the ID sensor 406. When it is determined that the ID sensor 406 detects the start/stop pulse area SSA in step S620, the controller 408 sets the second count value SSC of a start/stop pulse area SSA and an ID number IDN to "0" (step S621). Then, the controller 408 sets the first count value IRC of an ID recognition pulse area IRA and an ID recognition signal to "0" (step S622). At this time, the ID recognition signal RS is "0" indicates that the ID of the disk mounting section is not detected, while the ID recognition signal RS is "1" denotes that the ID is detected. Then in step S623, the controller 408 sets the count value LC of the low logic area LA to "0".

On the other hand, when it is determined that the ID sensor 406 does not detect the start/stop pulse area SSA in step S620, the controller 408 determines whether or not a second count value BEC of the beginning/end pulse area BEA is "1" (step S624). When it is determined that the count value BEC of the beginning/end pulse area BEA is "1" in step S624, the routine goes to step S622. On the contrary, when the count value BEC of the beginning/end pulse area BEA is not "1", the controller 408 determines whether or not the first count value BEC of the beginning/end pulse area BEA is "2" (step S625). When it is determined that the count value BEC of the beginning/end pulse area BEA is not "2" in step S625, the routine goes to step S623. On the contrary, when the count value BEC of the beginning/end pulse area BEA is "2", the controller 408 sets the count value IRC of the ID recognition pulse area IRA equal to the ID number IDN and sets the ID recognition signal RS to "1" (step S626). Then the controller 408 sets both the first count value IRC of the ID recognition pulse area IRA and the second count value BEC of the beginning/end pulse area BEA to "0" (step S627) and the routine goes to step S623. After step S623 is performed, the routine returns to step S602.

On the other hand, when it is determined that the logic states of the old and present pulses are "low", or the logic state OP of the old pulse or the logic state PP of the present pulse is "low" in step S617, the controller 408 determines whether or not logic states (OP and PP) of the old and present pulses are "low" (step S628). When it is determined that the logic states (OP and PP) of the old and present pulses are not "low" in step S628, the routine returns to step S602. On the contrary, when the logic states (OP and PP) of the old and present pulses are "low", the controller 408 determines whether or not the ID recognition signal RS is "1" (step S629).

When it is determined that the ID recognition signal RS is not "1" in step S629, the controller 408 adds "1" to the count value LC of the low logic area LA (step S630) and the routine returns to step S602. On the contrary, when the ID recognition signal RS is "1", the controller 408 determines whether or not the ID number IDN is equal to the selected ID (step S631). When it is determined that the ID number IDN is different from the selected ID in step S631, the routine goes to step S630. On the contrary, when the ID number IDN is equal to the selected ID, the controller 408 controls the driver 404 to stop the rotation of the turntable 404 (step S632). In step S633, the controller 498 determines whether or not the count value LC of the low logic area LA is greater than "10".

When it is determined that the count value LC of the low logic area LA is equal to or less than "10" in S633, the routine goes to step S630. On the contrary, when the count value LC of the low logic area LA is greater than "10", the controller 408 sets the present ID equal to the ID number IDN and sets the ID number IDN and the ID recognition signal RS to "0" (step S634). Then the routine goes to step S623 and returns to step S602.

Figure 7:
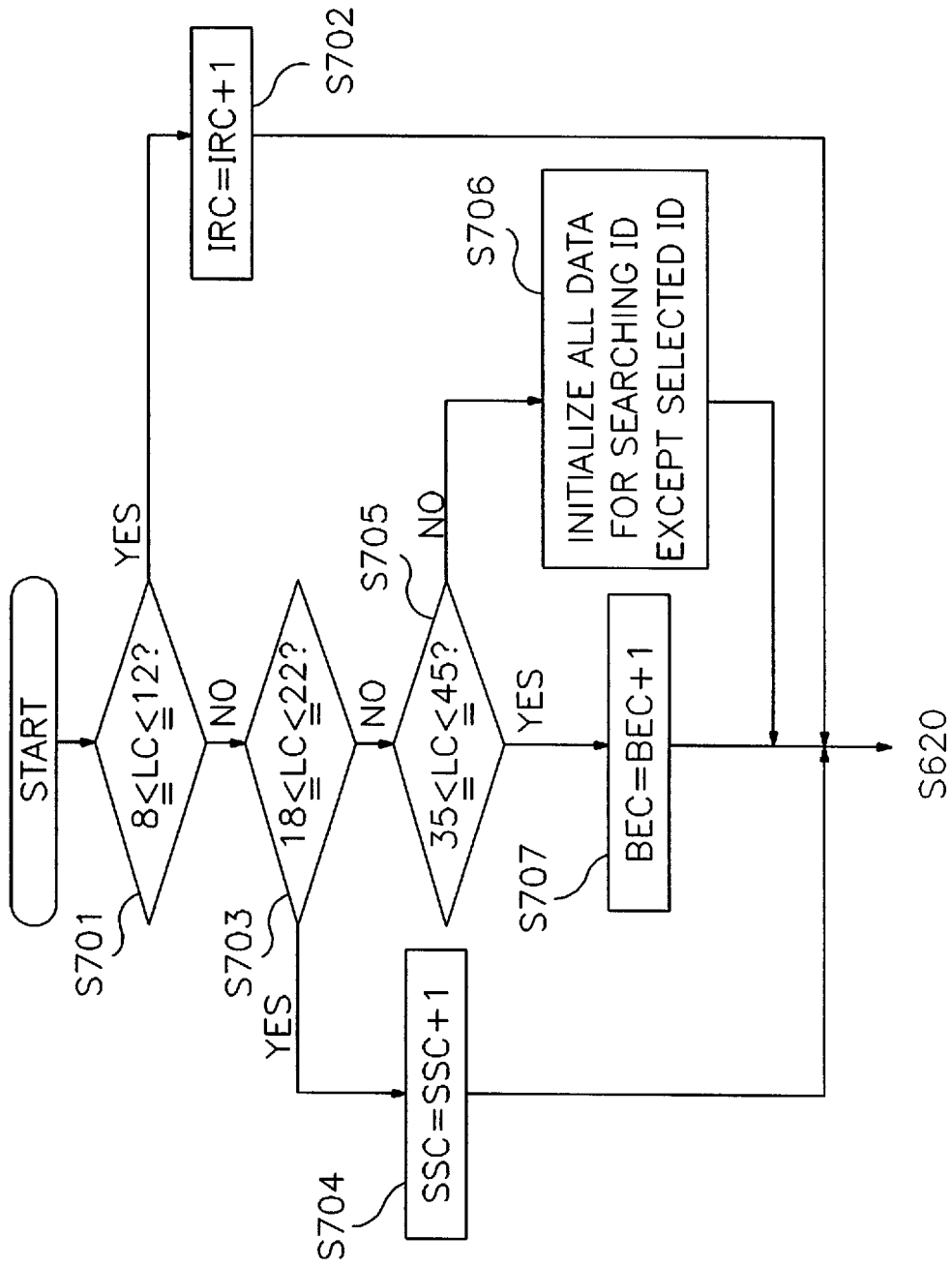
FIG. 7 is a flow chart for illustrating a method for discriminating the low logic area shown in FIG. 6.

FIG. 7 illustrates a method for discriminating the low logic area of step S619 in FIG. 6. In step S701, the controller 408 determines whether or not a fourth count value LC of the low logic area LA is between 8 and 12. When it is determined that the fourth count value LC of the low logic area LA is between 8 and 12 in step S701, the controller 408 adds "1" to the first count value IRC of an ID recognition pulse area IRA (step S702), and the routine goes to step S620 of FIG. 6. On the contrary, when the fourth count value LC is not between 8 and 12, the controller 408 determines whether or not the fourth count value LC of the low logic area LA is between 18 and 22 (step S703).

When it is determined that the fourth count value LC of the low area LA is between 18 and 22 in step S703, the controller 408 adds "1" to the third count value SSC of an start/stop pulse area SSA (step S704), and the routine goes to step S620 of FIG. 6. On the contrary, when the fourth count value LC of the low area LA is not between 18 and 22, the controller 408 determines whether or not the fourth count value LC of the low area LA is between 35 and 45 (step S705). When it is determined that the fourth count value LC of the low area LA is not between 35 and 45 in step S705, the controller 408 sets a first count value IRC of the ID recognition pulse area IRA, a second count value BEC of the beginning/end pulse area BEA, a third count value SSC of the start/stop pulse area SSA, a fourth count value LC of a low logic area LA, the ID number IDN, an identification recognition signal RS, and a present identification, and a generating interval of the signal for detecting the identification searching pulse, to "0", and sets logic states of the old and present pulses to "low". Then the routine goes to step S620 of FIG. 6. On the contrary, when the fourth count value LC of the low area LA is between 35 and 45, the controller 408 adds "1" to the second count value BEC of the beginning/end pulse area BEA (step S707), and the routine goes to step S620 of FIG. 6.

That is, the present invention performs a detection of the ID recognition pulse area IRA, the beginning/end pulse area BEA, and the start/stop pulse area SSA from the output pulse of the ID sensor 406 when the ID searching starts at an optional position. In the detection process, when the beginning/end pulse area BEA is detected, the controller 408 initializes all data and count value detected before the detection thereof, and searches a position corresponding to the ID selected by the user based on all data for searching the ID being detected after the detection of the beginning/end pulse area BEA.

As mentioned above, the present invention searches ID of a disk mounting section regardless of a rapid and exact rotating direction of a turntable to thereby play back a desired disk in an optical disk changer system.

The invention maybe embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A method for searching an identification of a disk mounting section in an optical disk changer system, said method comprising:
   (a) initializing all data for searching the identification;
   (b) determining whether a present identification is equal to a selected identification in order to control a driving of a disk which is mounted on the optical disk changer system according to the determination result;
   (c) determining whether the turntable of the optical disk changer system is rotating in order to control generation of a pulse for searching the identification including an identification recognition pulse area, a beginning/end pulse area, and a start/stop pulse area and control generation of a signal for detecting the identification searching pulse according to the determination result;
   (d) determining whether the detection signal is generated once every first time in order to control set values of an interval of the detection signal, an old pulse, and a present pulse, wherein the old and present pulses are respectively pulses which before and at present are detected in the detection signal according to the determination result;
   (e) determining whether the old and present pulses are a first state or a second state in logic;
   (f) determining whether an identification number is equal to the selected identification in order to determine whether a disk mounting section corresponding to the selected identification is searched when the old and present pulses are a first state in logic, and detecting the identification recognition pulse area, the beginning/end pulse area, and the start/stop pulse area when the old and present pulses are a second state in logic, in step (e).

2. The method according to claim 1, wherein all the data includes a first count value of the identification recognition pulse area, a second count value of the beginning/end pulse area, a third count value of the start/stop pulse area, a fourth count value of a first logic area, an identification number, logic states of the old and present pulses, an identification recognition signal, and a present identification, the selected identification, and a generating interval of the detection signal.

3. The method according to claim 1, wherein the first and second logic states are low and high, respectively.

4. The method according to claim 1, wherein the identification recognition pulse area, the beginning/end pulse area, and the start/stop pulse area are largest to smallest in order of magnitude.

5. The method according to claim 4, wherein the magnitudes of the identification recognition pulse area, the beginning/end pulse area, and the start/stop pulse area are twenty, forty, and eighty msecs, respectively.

6. The method according to claim 4, wherein the magnitude of the beginning/end pulse area is twice as much as the magnitude of the identification recognition pulse area.

7. The method according to claim 4, wherein the magnitude of the start/stop pulse area is twice as much as the magnitude of the beginning/end pulse area.

8. The method according to claim 1, wherein A magnitude of the second state between the start/stop pulse area and the beginning/end pulse area is larger than a magnitude of the beginning/end pulse area.

9. The method according to claim 1, wherein the first time is shorter than a time interval of the identification recognition pulse area.

10. The method according to claim 9, wherein the first time is 2 msecs.

11. The method according to claim 1, wherein step (b) includes
   (b-1) finishing a total operation when the present identification is equal to the select identification, and determining whether the disk is driving when the present identification is different from the selected identification;
   (b-2) stopping the disk and going to step (c) when the disk is driving, and determining whether the turntable is in a chucking-down state when the disk stops, in step (b-1); and (b-3) chucking down the turntable and going to step (c) when the turntable is in the chucking-up state, and rotating the turntable and going to step (c) when the turntable is in the chucking-down state.

12. The method according to claim 1, wherein step (f) includes
(f-1) determining whether the identification recognition signal is the first number when the old and present pulses are the first state in logic in step (f);
(f-2) adding the first number to the fourth count value and returning to step (b) when the logic value of the identification recognition signal is the first number, and determining whether the identification number is equal to the selected identification when the logic value of the identification recognition signal is the first number, step (f-1);
(f-3) going to the step of adding the first number to the fourth count value of step (f-2) when the identification number is different from the selected identification, and stopping the turntable when the identification number is equal to the selected identification, in step (f-2);
(f-4) determining whether the fourth count value is greater than a third number;
(f-5) going to the step of adding "1" to the fourth count value of step (f-2) when the fourth count value is equal to or less than the third number, and setting that the present identification is equal to the identification number and intializing the identification number and the identification recognition signal when the fourth count value is greater than the third number; and
(f-6) intializing the fourth count value and returning to step (b).

13. The method according to claim 1, wherein step (f) includes
(f-i) determining whether the fourth count value is initialized when the old and present pulses are the second state in logic in step (f);
(f-ii) intializing the fourth count value and returning to step (b) when the fourth count value is initialized, and discriminating the first logic area from the identification searching pulse when the fourth count value is not initialized;
(f-iii) determining whether the start/stop pulse area is detected;
(f-iv) initializing the second count value and the identification number and initializing the first count value and the identification recognition signal when the start/stop pulse area is detected, and determining whether the second count value is the first number when the start/stop pulse area is detected;
(f-v) going to the step of initializing the first count value and the identification recognition signal of step (f-iv) when the second count value is the first number, determining whether the second count value is a fourth number when the second count value is not the first number;
(f-vi) initializing the fourth count value and returning to step (b) when the second count value is not the fourth number, and setting the first count value equal to the identification number and initializing the first count value, the second count value, and the identification recognition signal when the second count value is the fourth number; and
(f-vii) intializing the fourth count value and returning to step (b).

14. The method according to claim 13, wherein step (f-ii) includes
(f-ii-1) determining whether the fourth count value is between a fifth number and a sixth number;
(f-ii-2) adding the first number to the first count value when the fourth count value is between the fifth number and the sixth number, and determining whether the fourth count value is between a seventh number and an eighth number when the fourth count value is not between the fifth number and the sixth number;
(f-ii-3) adding the first number to the third count value and going to step (f-iii) when the fourth count value is between the seventh number and the eighth number, and determining whether the fourth count value is between a ninth number and a tenth number when the fourth count value is not the seventh number and the eighth number, in step (f-ii-2); and
(f-ii-4) adding the first number to the second count value and going to step (f-iii) when the fourth count value is between the ninth number and the tenth number, and intializing all the data for searching identification except the selected identification going to step (f-iii) when the fourth count value is not between the ninth number and the tenth number.

15. The method according to claim 14, wherein the second number, the first number, the fourth number, the fifth number, the third number, the sixth number, the seventh number, the eighth number, the ninth number, and the tenth number are largest to smallest in order.

16. The method according to claim 14, wherein the first number, the second number, the third number, the fourth number, the fifth number, the sixth number, the seventh number, the eighth number, the ninth number, and the tenth number are one, zero, ten, two, eight, twelve, eighteen, twenty-two, thirty-five and forty-five, respectively.

17. A method for searching an identification of a disk mounting section in an optical disk system, said method comprising:
(i) initializing all data for searching the identification, wherein the all data including a first count value of the identification recognition pulse area, a second count value of the beginning/end pulse area, a third count value of the start/stop-pulse area, a fourth count value of a first logic area, the identification number, logic states of the old and present pulses, an identification recognition signal, and a present identification, the selected identification, and a generating interval of the signal for detecting the identification searching pulse;
(ii) determining whether a present identification is equal to a selected identification in order to control a driving of a disk which is mounted on the optical disk changer system according to the determination result;
(iii) determining whether the turntable of the optical disk changer system is rotating in order to control generation of a pulse for searching the identification including an identification recognition pulse area, a beginning/end pulse area, and a start/stop pulse area and control a signal for detecting the identification searching pulse according to the determination result;
(iv) determining whether the detection signal is generated once two msecs in order to control set values of an interval of the detection signal, an old pulse, and a present pulse, wherein the old and present pulses are respectively pulses which before and at present are detected in the detection signal according to the determination result;

(v) determining whether the old and present pulses are a low state or a high state in logic;

(vi) determining whether an identification number is equal to the selected identification in order to determines whether a disk mounting section corresponding to the selected identification is searched when the old and present pulses are a low state in logic, and detecting the identification recognition pulse area, the beginning/end pulse area, and the start/stop pulse area when the old and present pulses are a high state in logic, in step (v).

18. The method according to claim 17, wherein step (vi) includes (vi-1) determining whether a logic value of the identification recognition signal is one when the old and present pulses are the low state in logic in step (vi);

(vi-2) adding one to the fourth count value and returning to step (ii) when the logic value of the identification recognition signal is zero, and determining whether the identification number is equal to the selected identification when the logic value of the identification recognition signal is one.

(vi-3) going to the step of adding one to the fourth count value of step (vi-2) when the identification number is different from the selected identification, and stopping the turntable when the identification number is equal to the selected identification;

(vi-4) determining whether the fourth count value is greater than ten;

(vi-5) going to the step of adding one to the fourth count value in step (vi-2) when the fourth count value is equal to or less than ten, and setting the present identification equal to the identification number and intializing the identification number and the identification recognition signal when the fourth count value is greater than ten; and (vi-6) intializing the fourth count value and returning to step (ii).

19. The method according to claim 17, wherein step (vi) includes (vi-i) determining whether the fourth count value is initialized when the old and present pulses are the high state in logic in step (vi);

(vi-ii) intializing the fourth count value initialized and returning to step (ii) when the fourth count value is initialized, and discriminating a low logic area from the identification searching pulse when the fourth count value is not initialized;

(vi-iii) determining whether the start/stop pulse area is detected;

(vi-iv) initializing the second count value and the identification number and initializing the first count value when the start/stop pulse area is detected, and determining whether the second count value is one when the start/stop pulse area is detected;

(vi-v) going to the step of initializing the first count value and the identification recognition signal when the second count value is one, determining whether the second count value is two when the second count value of the beginning/end pulse area is not one;

(vi-vi) initializing the fourth count value and returning to step (ii) when the second count value is not two, setting the first count value equal to the identification number and initializing the first count value, the second count value, and the identification recognition signal when the second count value is two; and (vi-vii) intializing the fourth count value and returning to step (ii).

20. The method according to claim 19, wherein step (vi-ii) includes (vi-ii-1) determining whether the fourth count value is between eight and twelve;

(vi-ii-2) adding one to the first count value when the fourth count value is between eight and twelve, and determining whether the fourth count value is between eighteen and twenty-two when the fourth count value is not between eight and twelve;

(vi-ii-3) adding one to the third count value and going to step (vi-iii) when the fourth count value is between eighteen and twenty-two, and determining whether the fourth count value is between thirty-five and forty-five when the fourth count value is not eighteen and twenty-two, in step (vi-ii-2); and (vi-ii-4) adding one to the second count value and going to step (vi-iii) when the fourth count value is between thirty-five and forty-five, and intializing all the data for searching identification except the selected identification going to step (f-iii) when the fourth count value is not between thirty-five and forty-five.

* * * * *